Jan. 12, 1943.  L. J. LEWIS ET AL  2,308,183
PACKLESS VALVE
Filed Dec. 27, 1941

Leonard J. Lewis
Herman W. Oggenfuss
INVENTORS

Patented Jan. 12, 1943

2,308,183

UNITED STATES PATENT OFFICE 2,308,183

PACKLESS VALVE

Leonard J. Lewis and Herman W. Oggenfuss, Wilmington, Del., assignors to E. I. du Pont de Nemours & Company, Wilmington, Del., a corporation of Delaware Application December 27, 1941, Serial No. 424,564

3 Claims. (Cl. 251—31)

This invention relates to valves, especially those for fluids difficult to confine. More particularly, it appertains to packless valves for bi-phenyl and/or di-phenyl oxide lines.

The employment of bi-phenyl and di-phenyl oxide and mixtures thereof as heat transfer media has attracted wide attention, and the number of large scale installations is rapidly increasing. The literature on this subject is quite extensive, as evidenced by chemical abstracts XXIII 5564; XXIV 3508, 5132; XXV 4696; XXVI 5400, 5747; XXVII 3057; XXVIII 2809, 3811; XXIX 853, 962, 1966, 4476; XXX 4727; and U. S. A. Patents 1,864,349, 2,000,886, 2,081,120, etc.

A mixture of bi-phenyl and di-phenyl oxide is used quite extensively in both the liquid and vapor phase for industrial heating where uniform and relatively high temperatures are desired. Unfortunately this mixture creeps and pushes its way through the finest cracks and fissures, and makes necessary, for the sake of tightness, unusual precautions such as the brazing of screw-fitted pipe joints, to prevent leakage. The common packed valve is worthless in such a system. The heretofore known packless valves also have undesirable features.

The primary object of this invention was to provide an adequate packless valve for the handling of difficultly confinable penetrating fluids confined under pressure. Other objects were to design a valve which could be repeatedly opened and closed and used for long periods of time without developing leaks incurring from non-uniform wear of the valve plug and seat, and in which a minimum number of points for leakage is present. Still other objects were to produce a valve in which all the elements cooperating to prevent leakage either remain stationary or move as a unit, and to produce a packless valve in which the sealing means constituted a bellows having end supports incapable of relative movement about the axis of the bellows. Yet a further object was to provide a leakproof interior arrangement which could be used in valves comprising conventional body and bonnet arrangements. A general advance in the art, and other objects which will appear hereinafter, are also contemplated.

It has now been found that by dividing the valve stud into two parts, and enclosing the part carrying the plug in a unit comprising a sleeve and bushing soldered to a metallic bellows in the manner described in detail hereinafter, overcomes the aforementioned deficiencies of valve heretofore utilized in lines for bi-phenyl-di-phenyl oxide mixtures.

How the foregoing objects and related ends are accomplished will be apparent from the following exposition, in which are disclosed the principle and divers embodiments of the invention, including the best mode contemplated for carrying out the same. The written description is amplified by the accompanying drawing, in which.

Figures 1, 2, 3:
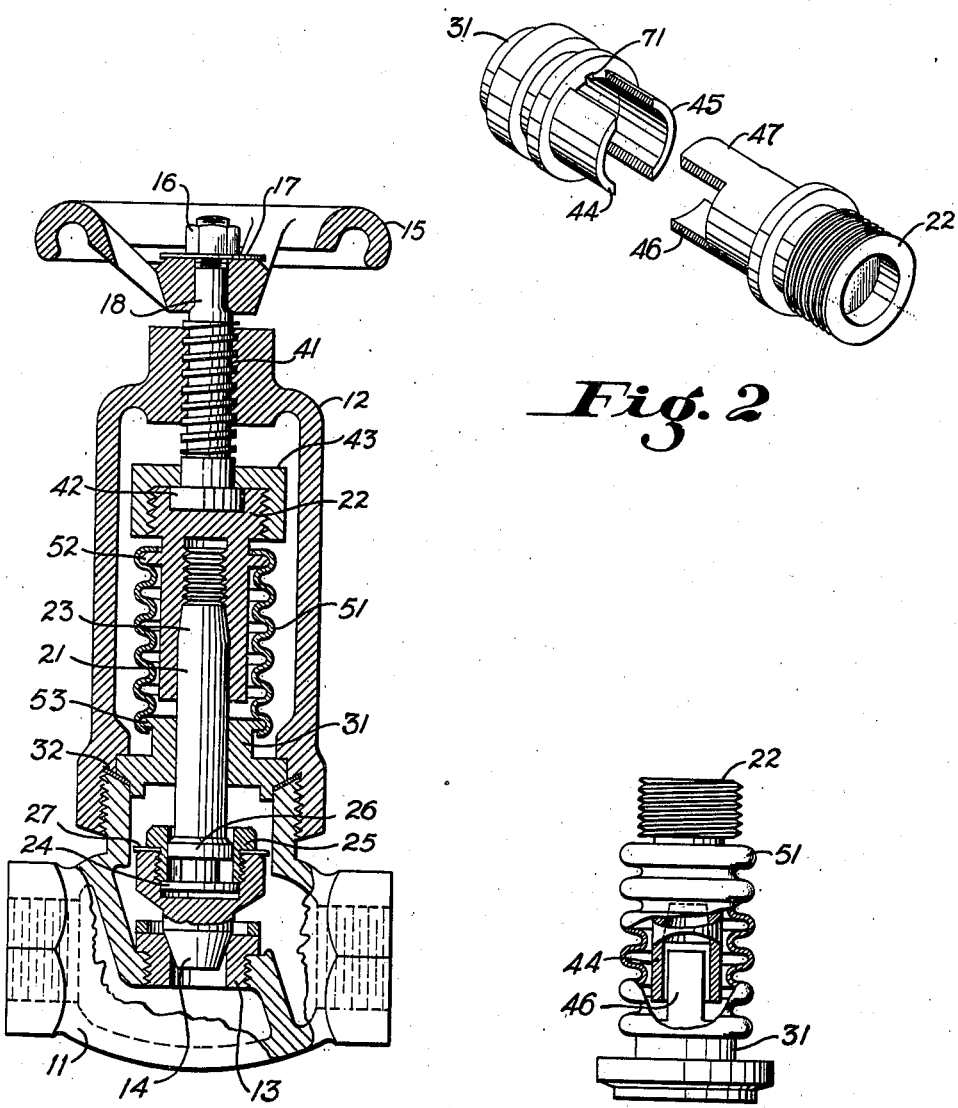
Figure 1 is an elevation view partly in section of the valve of this invention.
Figure 2 is a perspective view of the valve bellows supports.
Figure 3 is an elevation view, partly in section, of the leak-proofing unit comprising the valve bellows and its supports.

Referring now to Figure 1 of the drawing, it will be seen that the valve comprises the conventional body 11 and bonnet 12. It has a separable seat 13 and plug or disc 14. For convenience of illustration it is shown as having a hand wheel 15 secured by the conventional nut 16 and washer 17 arrangement to the projecting upper stem 18. Usually the hand wheel is cast with a square hole to receive the upper stem which has four milled correspondingly located flats. A slight taper permits easy assemblage.

The stud 21 terminates well inside the bonnet and has its upper end tightly threaded into a bellows sleeve 22. A taper 23 permits the parts to be screwed together in such a way that no slippage occurs during operation of the valve.

The stud is secured in the plug 14 by the coaction of its shoulder 24 and a locking nut 25. A smaller shoulder 26 assists in maintaining these parts in proper relation. Between these shoulders flats are milled to receive a wrench. Preferably a washer 27 is used between the locking nut and plug.

The stud slides and rotates freely near its lower end in a bellows bushing 31 which, together with a gas-tight gasket 32, is secured to the body by means of the bonnet.

The upper stem 18 is threaded through the bonnet as shown at 41, and terminates in a shoulder or collar 42 fitted into a recess in the upper part of the bellows sleeve 22. These parts are secured together by means of a retaining nut 43 which has flat surfaces milled on its outside to receive a wrench. The connection is such that when the upper stem rotates it does not cause a rotation of the bellows sleeve and the parts connected thereto.

The bellows sleeve 22 and the bellows bushing 31 have interlocking jaws 44, 45, 46 and 47. When these parts are assembled in the valve, these jaws prevent the bellows sleeve from rotating without carrying the bellows bushing with it, or, considered from another viewpoint, the bellows bushing being fixed in the valve prevents rotation of the bellows sleeve when the upper stem, which is connected thereto by the retaining nut 43, is rotated by the hand wheel or equivalent means. Covering the aforementioned jaws is a bellows 51 made of thin metal, preferably stainless steel or monel approximately 0.005 of an inch thick, and secured at its opposite ends to the collar 52 on the bellows sleeve, and collar 53 on the bellows bushing.

The bellows, sleeve and bushing are assembled to form a unit, the bellows being soldered to the collars which it overlaps. In one satisfactory arrangement a borax flux is applied to the bellows on the inside near its ends, for example, along the part which is to form its end convolutions or folds, the bushing and sleeve inserted, and the ends turned or spun over the collars. A bead of silver solder is then placed along the joint and the assembly heated to melt the solder for making a permanent seal.

A drain or channel 71 is cut into the bellows bushing, so that any material collecting in the side of the bellows can easily return to the valve body.

In ordinary practice the valve is brazed or welded into the line conveying the heated fluid. It follows that there is only one possible point where it is possible for vapor leakage, and that is at the connection between the bellows bushing 31 and the body 11. By making the gasket 32 of soft copper, this joint is effectively sealed, because it is only necessary to draw the connection tighter if any leakage is found.

The various valve parts may be made of conventional materials, as will be obvious to those skilled in the art. Preferably the body and bonnet are bronze, the sleeve and bushings of stainless or other alloy steel, the plug and seat of an alloy steel to resist wear, for example, a chrome steel, and the stud, stem and retaining nut of bronze or alloy steel.

Many of the advantages of the present valve will be apparent from a detailed description of the parts and its assembly. Its principal advantages are that it prevents leakage of difficultly confinable materials, and that it overcomes the disadvantages of standard globe valves utilizing stuffing or packing, which were practically useless with materials such as diphenyl oxide. The present invention provides a unit which can be used with standard bodies. It is eminently suited for liquid or vapor systems operating at high temperatures, for example, 500°–600° F. (260°–316° C.). It is impossible to rupture the sealing means by operation of the valve because the parts supporting the bellows are interlocked to prevent separate rotation. Although the bellows is securely fastened to its supporting parts, for example, by means of soldering to form a substantially closed cylinder, it cannot develop torsional strain by reason of turning forces such as would ordinarily develop should the cylindrical foot of the valve stem stick in the recess provided in the upper end of the sleeve, or the stud resist turning by reason of the sticking of the plug.

As many apparently widely different embodiments of this invention may be made without departing from the spirit and scope thereof, it is to be understood that this invention is not limited to the specific embodiments thereof except as defined in the appended claims.

We claim:

1. A packless valve comprising a bonnet and a body joined by screw threads, a plug bearing stud, an operating stem, an imperforate sleeve connecting said stud and stem and arranged to permit free rotation of the stem, a bushing about said stud clamped between the bonnet and body, said bushing and sleeve having interlocking jaws to permit axial separation and prevent relative rotation, and a flexible metal bellows surrounding said jaws and soldered to said sleeve and bushing.

2. A valve for diphenyl oxide lines comprising a body and a bonnet threaded together, an operating stem passing through said bonnet, a plug supporting stud and a gas impervious connection joining said stem and stud and disposed within the body and bonnet, said connection comprising an imperforate sleeve on the exterior of which the stem is rotatably mounted and on the interior of which the stud is fixedly secured, a bushing encircling the stud and clamped between the body and the bonnet, and a flexible metal tube surrounding and secured to said sleeve and bushing in a gas impervious manner, said bushing and sleeve having jaws which interlock inside said tubing to prevent relative rotation of said sleeve and bushing but to allow axial expansion and contraction of the connection as the valve is opened and closed.

3. A valve for diphenyl oxide lines comprising a body and a bonnet threaded together, an operating stem passing through said bonnet, a plug supporting stud and a gas impervious connection joining said stem and stud and disposed within the body and bonnet, said connection comprising an imperforate sleeve in which the stem is rotatably mounted and in which the stud is fixed, a bushing through which the stud passes, secured between the body and the bonnet, and a metal bellows connecting and sealed to said sleeve and bushing, said bushing and sleeve having jaws which interlock inside said bellows to prevent relative rotation of said sleeve and bushing and to allow axial expansion and contraction of the connection as the valve is opened and closed.

LEONARD J. LEWIS.
HERMAN W. OGGENFUSS.